(12) United States Patent
Hengst et al.

(10) Patent No.: US 8,325,415 B2
(45) Date of Patent: Dec. 4, 2012

(54) BINOCULAR TELESCOPE

(75) Inventors: Alfred Hengst, Lahnau (DE); Jens Kohlhase, Braunschweig (DE)

(73) Assignee: Minox GmbH Optische und Feinmechanische Werke, Wetzlar (DE)

( * ) Notice: Subject to any disclaimer, the term of this patent is extended or adjusted under 35 U.S.C. 154(b) by 366 days.

(21) Appl. No.: 12/598,517

(22) PCT Filed: Apr. 10, 2008

(86) PCT No.: PCT/DE2008/000608
§ 371 (c)(1),
(2), (4) Date: Mar. 8, 2010

(87) PCT Pub. No.: WO2008/135006
PCT Pub. Date: Nov. 13, 2008

(65) Prior Publication Data
US 2010/0188744 A1 Jul. 29, 2010

(30) Foreign Application Priority Data
May 2, 2007 (DE) .......................... 10 2007 020 529

(51) Int. Cl.
*G03B 23/00* (2006.01)
(52) U.S. Cl. .......................... 359/410; 359/425; 359/426
(58) Field of Classification Search .................. 359/399, 359/407–428, 480–482
See application file for complete search history.

(56) References Cited

U.S. PATENT DOCUMENTS

| | | | |
|---|---|---|---|
| D98,185 S * | 1/1936 | Reynolds | D16/132 |
| 5,071,242 A | 12/1991 | Yanagisawa | |
| 6,108,128 A * | 8/2000 | Funatsu | 359/407 |
| 6,186,018 B1 | 2/2001 | Ichikawa | |
| D510,372 S * | 10/2005 | Yeung | D16/132 |

FOREIGN PATENT DOCUMENTS

| | | |
|---|---|---|
| JP | 09 189846 A | 7/1997 |
| JP | 11 064738 A | 3/1999 |

OTHER PUBLICATIONS

International Search Report, including English translation mailed Aug. 20, 2008 (four (4) pages).
English Translation of International Preliminary Report on Patentability (seven (7) pages).

* cited by examiner

*Primary Examiner* — Thong Nguyen
(74) *Attorney, Agent, or Firm* — Crowell & Moring LLP

(57) ABSTRACT

A binocular telescope with internal focusing and two cylindrical barrel tubes, each fastened to a bridge and accommodating an objective lens, a focusing lens, a prism system for image inversion and an eyepiece. The prism system is configured so that the optical axis of the eyepieces is offset relative to the optical axis of the objective lenses. The bridge is provided with two cylindrical apertures in which the barrel tubes are mounted parallel to one another, each rotatable about the optical axis of its objective. Each barrel tube comprises a rotary sleeve, an objective tube and an eyepiece tube. The bridge is one piece and has a small length compared to the barrel tube length. The rotary sleeves are inserted into the apertures and the objective tubes and eyepiece tubes are connected to the rotary sleeves such that they lie rotatable on the upper and lower sides of the bridge.

15 Claims, 8 Drawing Sheets

BINOCULAR TELESCOPE

BACKGROUND OF THE INVENTION

The invention relates to a binocular telescope comprising two barrel tubes, each fastened to a bridge and accommodating an objective lens, a focusing lens, a prism system for image inversion, and an eyepiece, wherein the prism system is oriented so that the optical axis of the eyepieces is offset relative to the optical axis of the objective lenses.

In binocular telescopes with objective lenses of relatively large diameter, the optical axes of the barrel tubes on the objective side have a separation from one another which differs greatly from the normal separation of the eyes of an observer. It is therefore known to provide the separation of the optical axes on the eyepiece side with an offset by means of an intermediate prism system.

Adaptation to the individual eye separation is achieved with the aforementioned telescopes in that, for example, the two barrel tubes are rotatably connected to one another via an articulation bridge. In general, the elements of the articulation bridge are components of the telescope body. However, it is also possible to fasten the two barrel tubes rotatably to a bridge.

The two elements of the articulation bridge conventionally extend over a large part of the length of the barrel tubes. This can make grasping of a barrel tube more difficult when handling the telescope. It is also possible to provide two articulation joints which allow grasping around one of the barrel tubes. Care must be taken herein to ensure careful alignment of the articulation joints to one another.

When the telescope is put down, the articulation angle can become altered due to the pressure on the articulation bridge or the articulation joints, so that the pupil separation of the eyepieces must be brought to the individual eye separation again. An effective, robust fixing device for the adjusted pupil distance which can be actuated with the application of little force is difficult to achieve due to the unfavorable lever effect with a conventional bridge. In the case of an articulation bridge with two articulation points, a fixing device of this type cannot be achieved.

Due to the small articulation angle and the small joint diameter, it is also very difficult to apply a sufficiently accurate scale for the adjusted pupil separation at the joint sites. A prior adjustment to known individual eye separations is therefore not possible.

For packing the telescope, the barrel tubes are usually pulled far apart in order to enable accommodation in as flat a case as possible. When the barrel tubes are pressed together, the fingers of the user can become painfully trapped.

DE 106 130 C describes a prism binocular telescope comprising two prism binocular telescope housings with an essentially triangular cross-section. The optical axes of the objective lenses and of the eyepieces are parallel to one another in mutually opposed outer cross-sectional regions of the telescope housings. The telescope housings are inserted into a bridge along their full length. The bridge comprises a central column with a preferably triangular cross-section and support plates fastened thereon above and beneath, in which the telescope housings are mounted rotatable about the optical axes of the objective lenses. The eyepiece tubes are placed on the telescope housings outside the region of the support plates and are height-adjustable for focusing. On rotation of the telescope housings, the eyepiece tubes perform a partial rotation about the optical axes of the objectives, and this is useful for adjustment of the pupil separation. In the position of the smallest pupil separation, the column of the bridge lies in a form-fitting manner in the inner cross-sectional region formed by the telescope housings, so that in this position, a compact packing configuration results.

DE 100 54 138 A1 describes a binocular telescope wherein two objective lenses are firmly arranged on a base part. At the eyepiece-side portion of the base part, eyepiece tubes are mounted rotatable about the optical axes of the objective lenses, said eyepiece tubes also containing the prism system for image inversion. During pivoting of the eyepiece tubes for adjusting the pupil distance, similar difficulties occur as with telescopes which have an articulation bridge.

U.S. Pat. No. 5,973,830 A describes a binocular telescope with adjustment of the pupil separation. The two telescope barrels have parts which are designed distinctly offset relative to one another in the longitudinal direction for accommodating the objective lenses, the prism systems and the eyepieces. The prism systems create a very large offset of the optical axes of the objectives and the eyepieces. The partial regions of the telescope barrels with the objectives are rotatably set into a rigid bridge and lie close to one another. A clamping plate which is placed on the eyepiece-side prism portion of the telescope barrels and is connected to the bridge secures the telescope barrels against falling out of the bridge and permits rotation of the telescope barrels about the optical axes of the objective lenses. For setting the pupil separation, the oval housing portions with the prism systems must be manually pivoted relative to one another. The operation thereof suffers the same disadvantages as binoculars with an articulation bridge.

It is therefore an object of the invention to improve operation when grasping one of the barrel tubes, to secure against unintentional displacement the individual setting of the pupil separation to an eye separation and to enable flattened-out accommodation of the telescope in a case without changing the eye separation setting.

SUMMARY OF THE INVENTION

This object is achieved with a binocular telescope of the aforementioned type in that a rigid bridge is provided with two openings in which the barrel tubes are mounted parallel to one another and each rotatable about the optical axis of the respective objective lens.

The essential concept of the invention lies in mounting two similar barrel tubes rotatably in a rigid bridge in mirror-image symmetry to one another. The mounting of the barrel tubes takes place in a region in which the axis of rotation coincides with the optical axis of the objective. On rotation of the barrel tube, due to the offset of the optical axes, the optical axis of the eyepiece revolves around the optical axis of the objective lens, so that the separation of the optical axes of the eyepieces of the two barrel tubes is altered relative to one another. Herein, the separation of the optical axes of the objective lenses, which is pre-selected by design for convenient gripping of a barrel tube, remains unchanged.

In order to create a favorable center of gravity position when the barrel tubes are held, the rotary bearing of the barrel tubes is arranged close to the prism system, preferably on the side of the prism system facing away from the eyepiece. Due to the general optical imaging conditions, this results in a position close to the eyepieces so that a focusing knob can be placed centrally to the barrel tubes on the bridge so as to provide for a convenient grip.

The spatial geometry between the bridge and the barrel tubes does not change on rotation of the barrel tubes. When the telescope is put down, the pupil separation as set cannot be altered by lateral pressure on the bridge or the barrel tubes.

For packing the telescope in a case, no change to the geometry of the telescope is required, so that the case form can be adapted to the normal usage configuration of the telescope.

Coupling means for even counter-rotation of the barrel tubes are advantageously provided in the bridge. In a basic configuration, the barrel tubes can be oriented, in a plan view of the pupils of the eyepieces, such that the pupils lie symmetrically to one another on a cross-sectional surface of the bridge. Due to the effect of the coupling means, this symmetry is maintained during adjustment of the pupil separation. As the coupling means, a crossed belt drive or cable drive or toothed gearing can be provided. For the absolute securing of a selected pupil separation, the coupling means can be made reliably lockable with little application of force.

In order to displace the focusing lenses within the barrel tubes, a focusing knob can preferably be rotatably mounted on the bridge on the eyepiece side between the barrel tubes. With a projection of the bridge which projects slightly angled, the focusing knob can be arranged in a position that is largely free relative to the barrel tubes. The ease of operation of the focusing knob is thereby significantly improved. In a known manner, the focusing knob can be axially adjustable in two detent positions.

Driving levers which preferably face perpendicularly into the bridge can be connected in a known manner to the mounting sleeves of the focusing lens. The driving levers are guided in the bridge through radial slits in the barrel tubes and axial guide slits in the central portion of the bridge housing.

The focusing knob can be connected to a threaded spindle which extends into the bridge and is coupled within the bridge to a grooved disk in which the drive levers for the focusing lenses engage. The grooved disks can comprise, in a first region, a radial groove extending in one plane and, in a second region, a radial, axially rising groove.

The coupling between the threaded spindle and the grooved disk is preferably configured so that in a first detent position of the focusing knob, on rotation thereof, an axial displacement of the grooved disk is brought about via a straight guide. This leads, via the drive levers, to a synchronous adjustment of the focusing lenses. By contrast, in a second detent position of the focusing knob, on rotation thereof, a rotation of the grooved disk together with the threaded spindle is brought about. This leads thereto that a displacement of the associated focusing lens for diopter equalization takes place only via the axially rising groove. The diopter setting can be read off from a diopter scale which is revealed in the second detent position.

At least one of the barrel tubes can suitably be provided at the outer periphery at a region adjoining the bridge with a scale for displaying the rotation of the barrel tube relative to a marking placed on the bridge. The values on the scale can show, in particular, the pupil separation corresponding to the rotation. If the individual eye separation is known, a rapid and accurate prior setting of the pupil separation is possible.

On the underside of the bridge, a tripod mounting can be provided, oriented perpendicularly to the barrel tubes. The tripod mounting can be configured as a threaded bore. With a counter-rotating coupling of the barrel tubes, even when the pupil separation is altered, the view into the eyepieces always remains horizontal on the tripod.

Conventionally, the barrel tubes are made with their formed-on articulated bridge parts by molding. This involves high casting costs. Cast bodies often have non-sealing sites due to inhomogeneity in the material. Due to the alloy components in the cast material, the surfaces of the cast bodies are unsuitable for decorative anodizing processes and therefore usually require painting or covering.

The barrel tubes and the bridge are therefore preferably made as extruded parts, for example, from homogeneous aluminum. Extruded tubes are water-tight. Extruded bridge profiles can be made, depending on the barrel tubes to be mounted therein, at different lengths without additional tool costs. The surfaces of, in particular, aluminum extruded parts can be provided with decorative anodized protective layers.

BRIEF DESCRIPTION OF THE DRAWINGS

An illustrative embodiment of the binocular telescope will now be described in greater detail making reference to the schematic drawings, in which.

DETAILED DESCRIPTION

Figure 1:
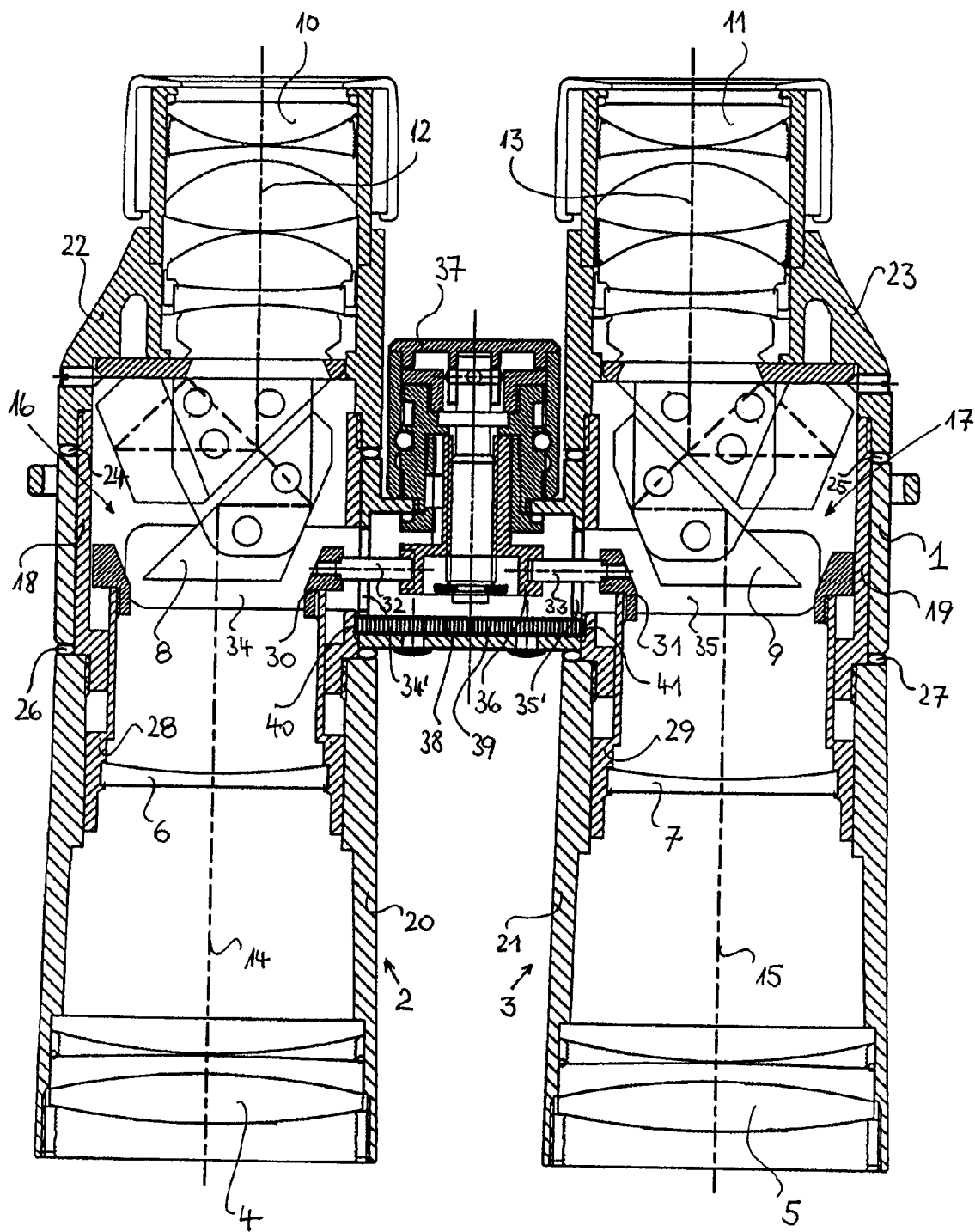
FIG. 1 shows a longitudinal section through the telescope.

FIG. 1 shows a longitudinal section through the telescope with the two barrel tubes 2, 3 fastened to a bridge 1. The barrel tubes 2, 3 each contain an objective lens 4, 5, a focusing lens 6, 7, a prism system 8, 9 for image inversion and an eyepiece 10, 11. The prism systems 8, 9 each create an offset of the optical axes 12, 13 of the eyepieces 10, 11 relative to the optical axes 14, 15 of the objective lenses 4, 5.

The bridge 1 is rigidly configured in one piece and has two apertures 16, 17 in which the barrel tubes 2, 3 are mounted mutually parallel and each rotatable about the optical axis 14, 15 of the respective objective 4, 5.

For the rotatable mounting of the barrel tubes 2, 3, said barrel tubes each comprise a rotary sleeve 18, 19, the outer diameter of which is adapted to the wall of the apertures 16, 17 in the bridge 1. Objective tubes 20, 21 and eyepiece tubes 22, 23 are fastened at the ends of the rotary sleeves 18, 19 projecting from the bridge 1. The end faces of the objective tubes 20, 21 and the eyepiece tubes 22, 23 rest, via flexible sealing rings 24, 25 and 26, 27, against the bridge 1. The rotary sleeves 18, 19, the objective tubes 20, 21 and the eyepiece tubes 22, 23 are screwed to one another such that the compressed sealing rings 24, 25; 26, 27 allow rotation of the barrel tubes 2, 3 assembled in this manner and effective sealing for gas filling of the barrel tubes 2, 3.

The mounting sleeves 28, 29 of the focusing lenses 6, 7 are mounted in the objective tubes 20, 21 displaceable rotationally and longitudinally. Transfer rings 30, 31 facing toward the bridge 1 are fastened to the mounting sleeves 28, 29.

Fastened to the portion of the transfer rings 30, 31 lying in the region of the bridge 1 are drive levers 32, 33 which reach through the slits 34, 35 in the rotary sleeves 18, 19 and through a guide slit 34', 35' extending in the axial direction in the bridge housing into the central portion of the bridge 1. The slits 34, 35 and the guide slits 34', 35' are arranged at such a height in the axial direction that the drive levers 32, 33 can be displaced unhindered over the whole focusing travel of the focusing lenses 6, 7. In the radial direction, the slits 34, 35 are sufficiently wide open that the rotation of the barrel tubes 2, 3 is not hindered by the drive levers 32, 33 which are radially fixed in the guide slits 34', 35'. The drive levers 32, 33 engage in a grooved disk 36. The displacement of the grooved disk 36 by actuating the focusing knob 37 and the displacement of the focusing lenses 6, 7 which is coupled thereto will be described below in greater detail by reference to FIGS. 6 to 10.

In order to ensure an even counter-rotation of the two barrel tubes 2, 3 in the apertures 16, 17 of the bridge 1, two similar gear wheels 38, 39 which mesh with one another are rotatably mounted on the base of the bridge 1. Mounted on a part of the outer periphery of the rotary sleeves 18, 19 are toothed rings 40, 41 which cooperate with gear wheels 38, 39. Naturally, in place of the toothed gearing shown, known belt or cable drives can also be provided which both encompass the rotary sleeves 18, 19 and also cross one another within the bridge 1.

Figure 2:
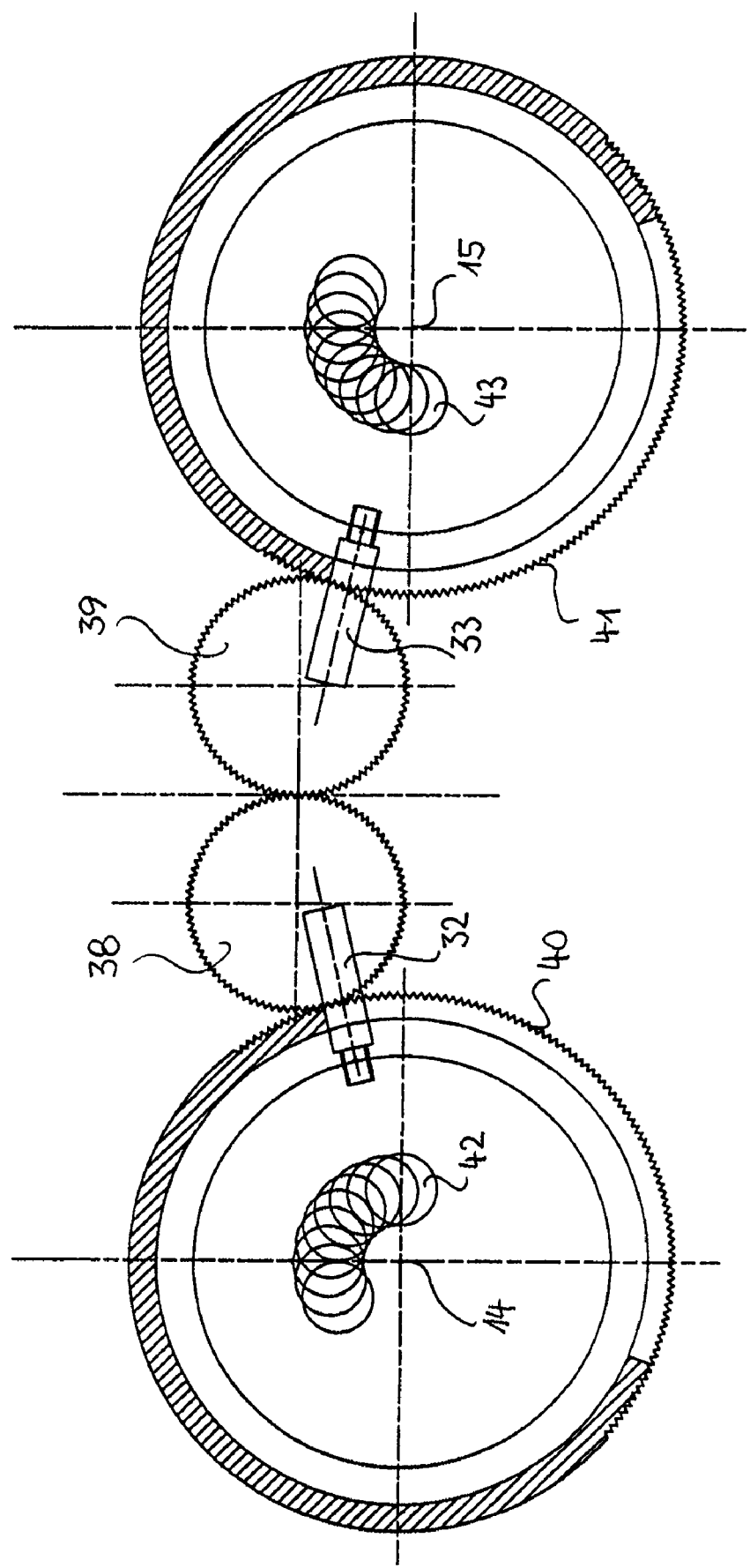
FIG. 2 shows a rotational coupling of the barrel tubes.

FIG. 2 shows the cooperation of the gear wheels 38, 39 with the toothed rings 40, 41. On a movement of the barrel tubes 2, 3 along the toothed rings 40, 41, the barrel tubes 2, 3 move around the optical axes 14, of their objectives. The pupils 42, 43 of the eyepieces 10, 11 move herein from the closest separation on the connecting line between the optical axes 14, 15 to a further-removed separation at the end of the overlapping chain of pupil images.

Figure 3:
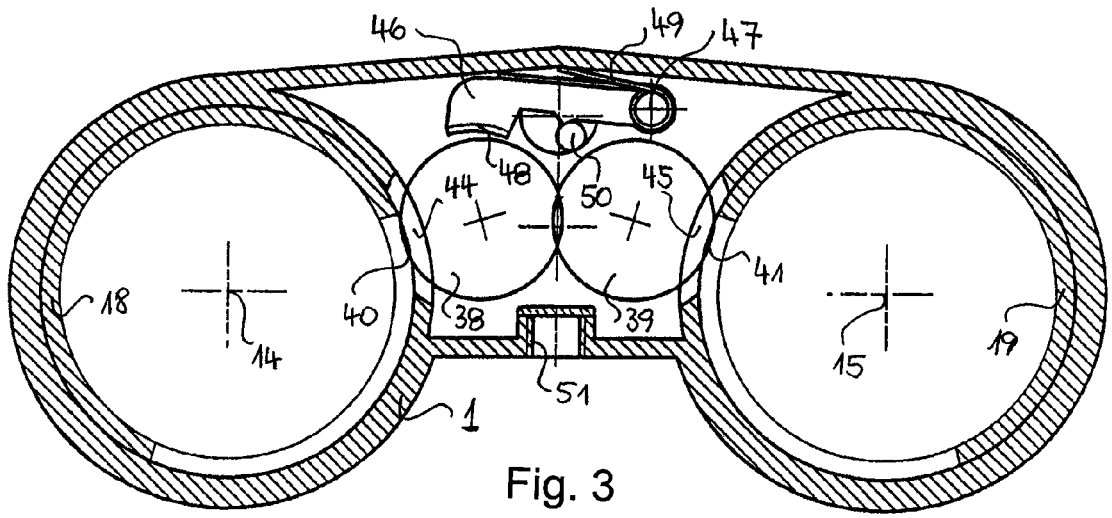
FIG. 3 shows a cross-section through the bridge with the detent lever in the released condition.

FIG. 3 shows a cross-section through the bridge 1 with the rotary sleeves 18, 19 mounted therein, the meshing gear wheels 38, 39 and the toothed rings 40, 41 cooperating therewith. The gear wheels 38, 39 engage through slit-shaped apertures 44, 45 in the central part of the housing of the bridge 1. In the central part of the bridge 1, a locking lever 46 is mounted pivotable about an axis 47 in the same plane as the gear wheels 38, 39.

The head 48 of the locking lever 46 is provided with toothing which can engage in the toothing of the gear wheel 38. The locking lever 46 is under the tension from a spring 49, which presses against the housing of the bridge 1, and is supported on an eccentric 50 when in the condition released from the gear wheel 38.

Figure 4:
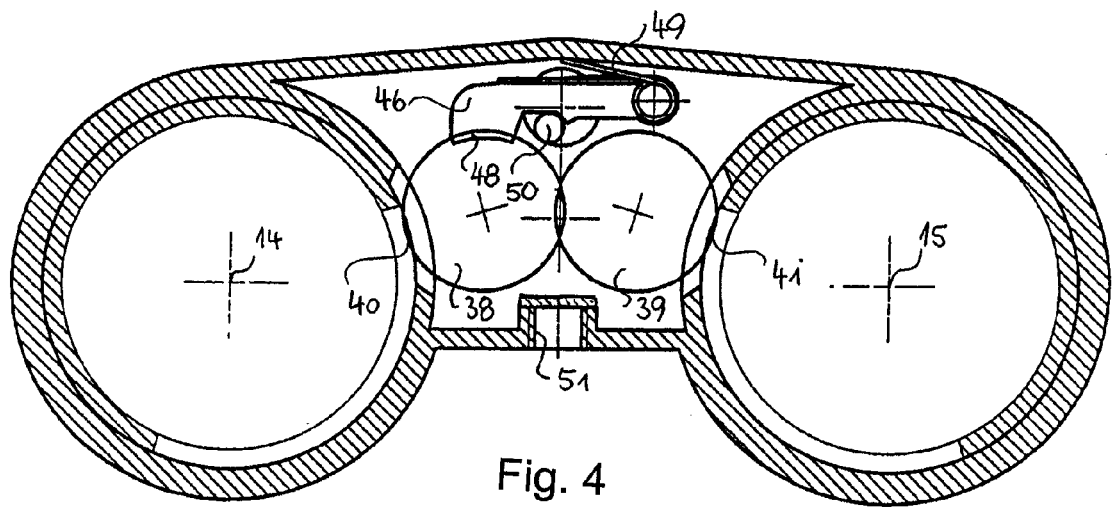
FIG. 4 shows a cross-section through the bridge with the detent lever in engagement.

FIG. 4 shows the same arrangement as in FIG. 3, but with the eccentric 50 in a rotated position in which the head 48 of the locking lever 46 is in engagement with the gear wheel 38 under tension from the spring 49. A rotation of the gear wheels 38, 39 and of the toothed rings 40, 41 is thereby blocked. In this way, the separation of the pupils 42, 43 once set is locked.

If the counter-rotation of the barrel tubes 2, 3 is coupled by a belt drive or cable drive, suitable clamping apparatus can be provided for locking thereof.

In the lower central portion of the bridge 1, a thread 51 is also provided as a tripod mounting. The axis of the thread 51 is oriented perpendicularly to the longitudinal sectional plane of the barrel tubes 2, 3.

Figure 5:
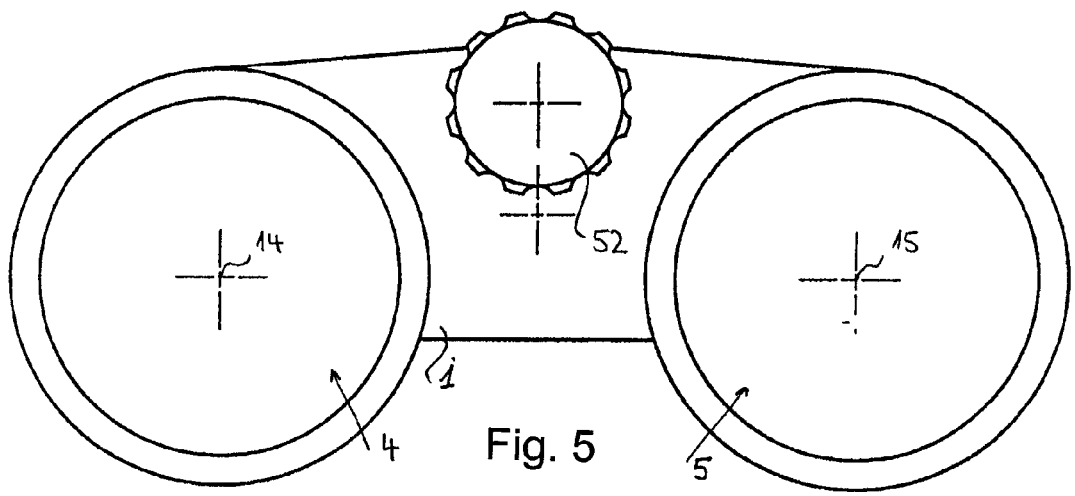
FIG. 5 shows an objective lens-side plan view of the bridge with the rotary locking knob.

FIG. 5 shows a plan view of the bridge 1 from the objective side. Arranged at the central section of the bridge 1 is a rotary locking knob 52 for actuating the eccentric 50. Similarly, the focusing knob 37 is arranged in the plan view of the bridge 1 from the eyepiece side.

Figure 6:
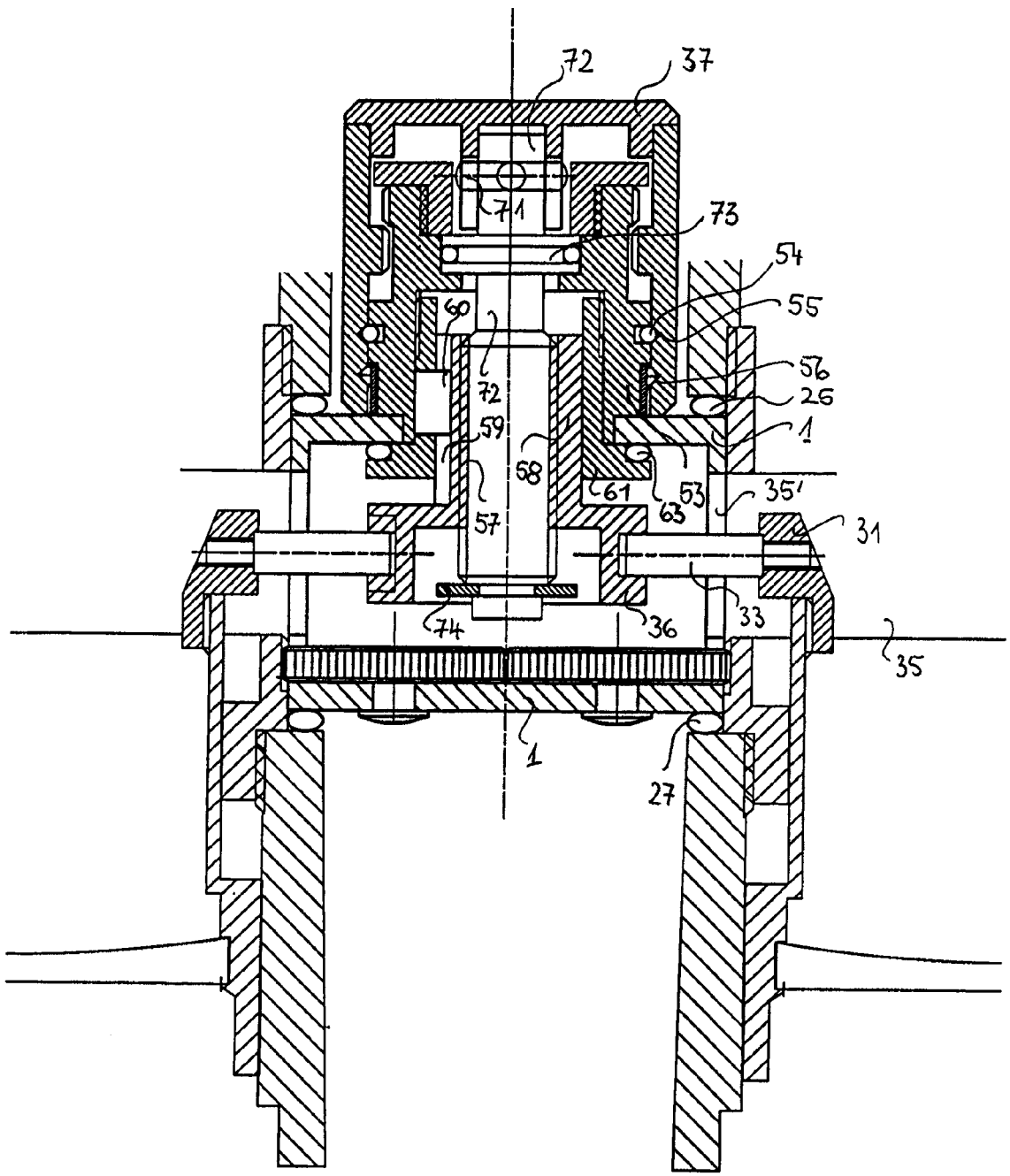
FIG. 6 shows a longitudinal section through the focusing knob in a first detent position.

FIG. 6 shows a longitudinal section through the focusing knob 37 in a first detent position wherein the lower edge of said focusing knob lies on the eyepiece-side cover of the bridge 1. The focusing knob 37 is rotatably mounted on a retaining ring 53 which is mounted in the cover of the bridge 1 so as to be rotatable after overcoming a frictional force. For this purpose, the retaining ring 53 is screwed together with a ring element 61 which lies against the bridge 1 in the inner housing portion of the bridge 1 via an O-ring 63 which is elastically tensioned by means of the screwing together. The O-ring 63 generates a frictional force between the ring element 61 and the bridge 1 and also serves to seal the internal space of the bridge 1 both against the penetration of dampness and against the escape of a gas filling.

The retaining ring 53 comprises a spring ring 54 as the detent means which can be brought into engagement with first and second detent notches 55, 56 in the focusing knob 37.

The focusing knob 37 is coupled via a pin/slit connection 71 to the cylindrical upper portion 72 of a threaded spindle 57. The cylindrical upper portion 72 of the threaded spindle 57 is provided with a protruding O-ring carrier 73. An O-ring laid therein presses against the retaining ring 53 and thus protects the interior of the focusing knob 37 against the penetration of dampness. A shaft 58 connected to the grooved disk 36 is screwed onto the thread of the threaded spindle 57. The shaft 58 is guided straight in the axial direction via a groove 59 set therein and a nose 60 on the ring element 61 in the first detent position 54, 55 created by a spring ring 54 and a detent notch 55. On rotation of the focusing knob 37, a rotation of the threaded spindle 57 thus produces an axial displacement of the grooved disk 36. Mounted at the lower end of the threaded spindle 57 is a disk element 74 which limits the axial displacement range.

Figure 7:
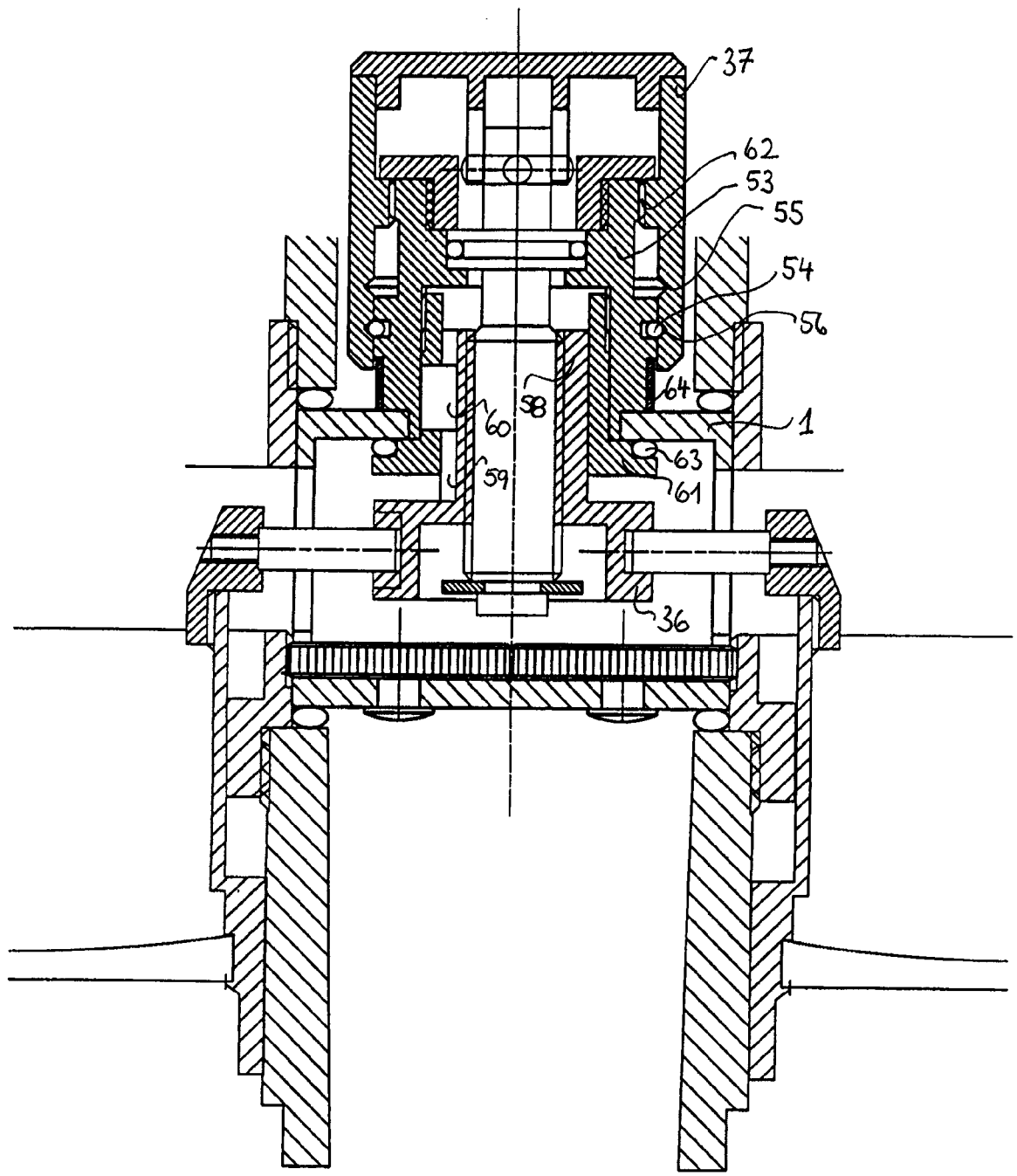
FIG. 7 shows a longitudinal section through the focusing knob in a second detent position.

FIG. 7 shows a longitudinal section through the focusing knob 37 in a second detent position 54, 56 generated by the spring ring 54 and a detent notch 56. In the second detent position 54, 56, a form-fitting connection 62 is made between the focusing knob 37, via the retaining ring 53, to the ring element 61 which is firmly connected to the retaining ring 53. On rotation of the focusing knob 37, therefore, via the straight guide 59, 60, as the frictional force generated by the O-ring 63 is overcome, the shaft 58 and thus the grooved disk 36 are also rotated.

A diopter scale 64 which also rotates during rotation of the focusing knob 37 is firmly connected to the retaining ring 53. The fixed index required for reading or setting the diopter value is situated at a visible site on the eyepiece-side housing cover of the bridge 1 and is not shown in greater detail.

Figure 8:
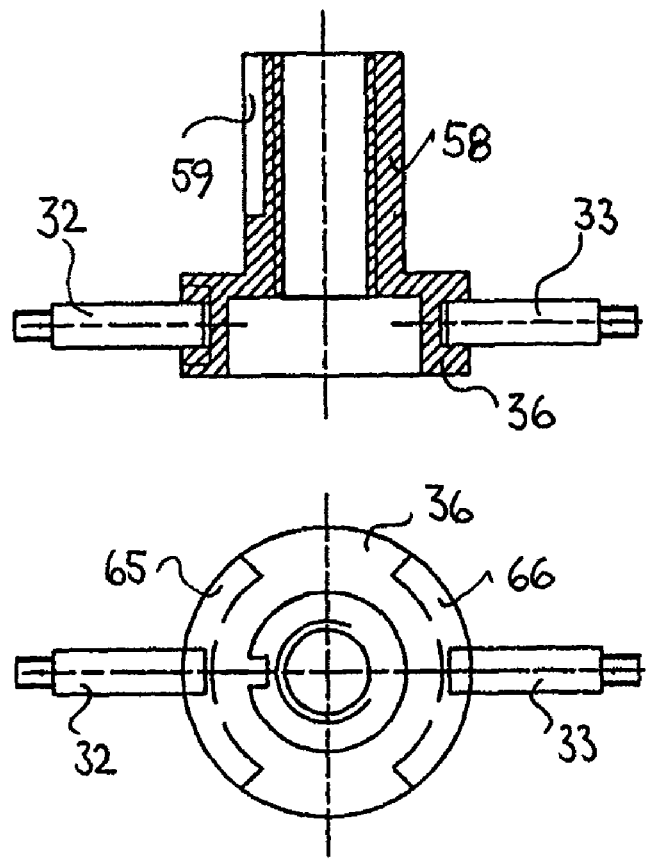
FIG. 8 shows a longitudinal and a transverse section through the grooved disk.

FIG. 8 shows a longitudinal section and a cross-section through the grooved disk 36 with the engagement of the drive levers 32, 33 in the adjusting grooves 65, 66 of the grooved disk 36. The adjusting grooves 65, 66 each extend over a radial segment region of the grooved disk 36.

Figure 9:
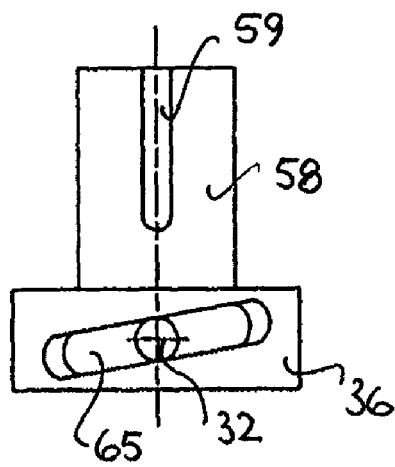
FIG. 9 shows a plan view of the axially rising groove.

FIG. 9 shows a plan view of an axially rising adjusting groove 65.

Figure 10:
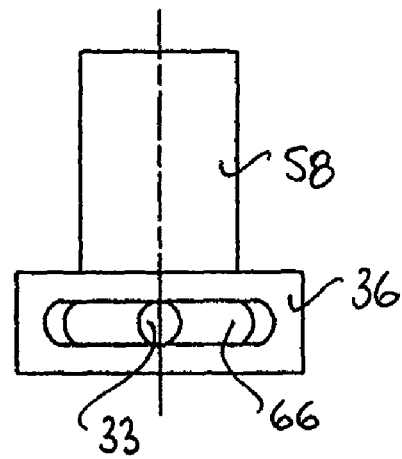
FIG. 10 shows a plan view of the groove extending in one plane.

FIG. 10 shows a plan view of an adjusting groove 66 extending in one plane perpendicular to the longitudinal axis of the shaft 58.

On an axial movement of the grooved disk 36, the drive levers 32, 33 and the focusing lenses 6, 7 coupled thereto are moved synchronously up and down. On rotation of the grooved disk 36, the axial position of the drive lever 33 does not change, whereas the drive lever 32 and the focusing lens 6 coupled thereto are axially displaced. The displacement of the focusing lenses 6, 7 relative to one another serves to compensate for a mismatch between the two eyes of the observer (with a diopter compensation).

The diopter adjustment coupled to the central focusing knob 37 is comfortable in operation, but complex in design. It is naturally also possible to bring about the individual diopter setting in a known manner by adjusting the eyepieces or the objectives.

The rigid connection of the drive levers 32, 33 used in the exemplary embodiment to the transfer rings 30, 31 causes a rotation of the focusing lenses 6, 7 about the optical axes 14, 15 of the objectives 4, 5, due to the guidance of the drive levers 32, 33 in the guide slits 34', 35' on rotation of the barrel tubes 2, 3. In order to avoid possible centering errors during a rotation of this type, the drive levers 32, 33 can, for example, also be mounted as tilting levers in the central portion of the bridge 1 and provided at their ends with ball-shaped heads, which engage in the adjusting grooves 65, 66 of the grooved disk and corresponding radial grooves in the transfer rings 30, 31. For this purpose, the transfer rings 30, 31 should be provided with an axial straight guide on the objective tubes 20, 21. Alternative adjusting means of this type are known per se.

Figure 11:
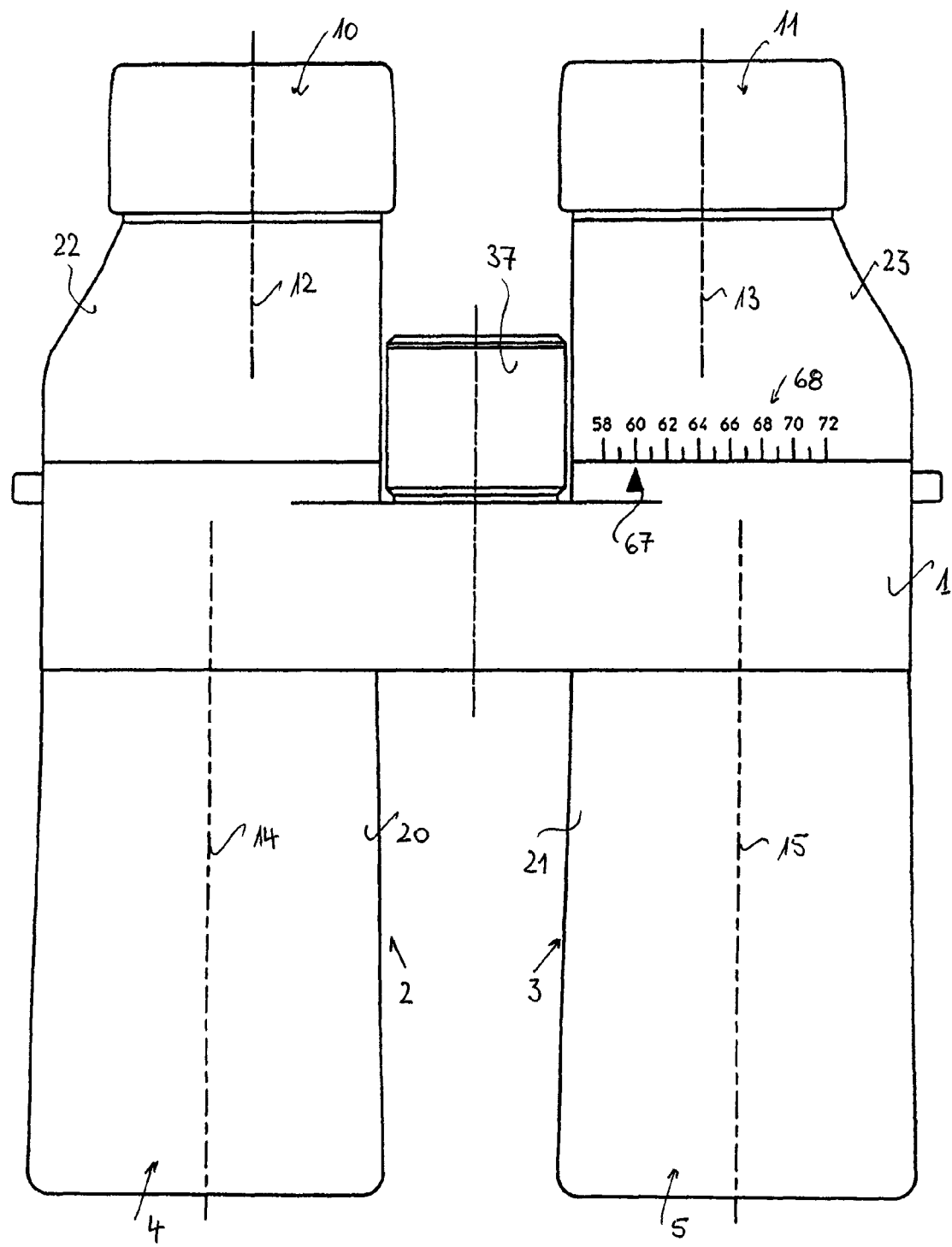
FIG. 11 shows a plan view of the telescope with the rotary setting scale.

FIG. 11 shows a plan view of the binocular telescope. Applied to the front side of the bridge 1 is a fixed marking 67. Applied to the eyepiece tube 23 of the barrel tube 3 adjacent to the bridge is a scale 68 which shows, for example, the pupil separation of the eyepieces 10, 11 resulting from the relative rotation of the barrel tubes.

Figure 12:
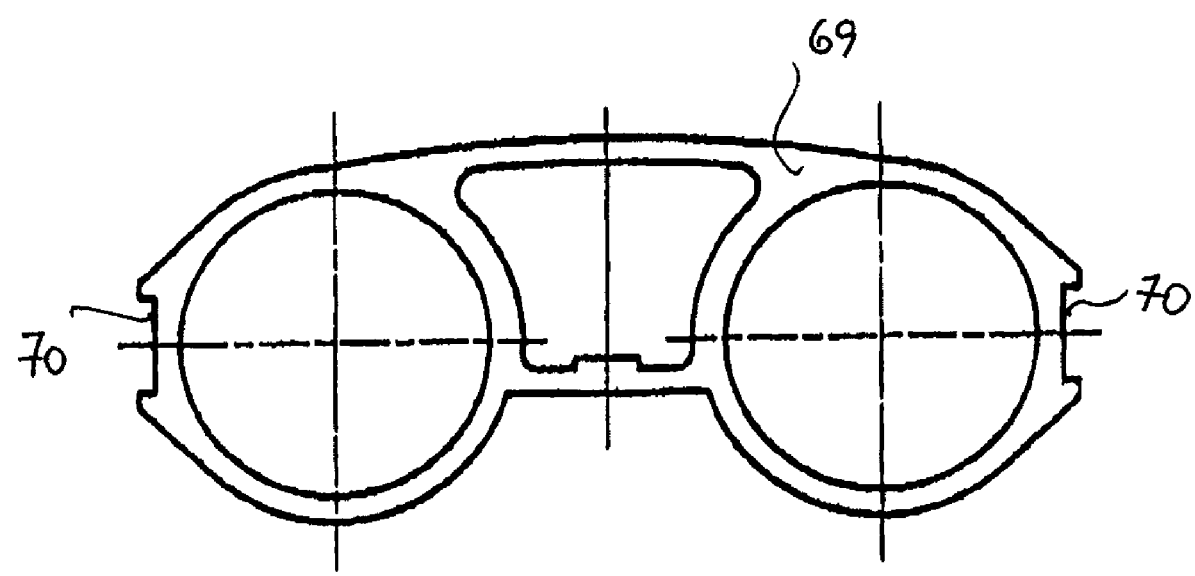
FIG. 12 shows a cross-section through an extruded part for bridge elements.

FIG. 12 shows a cross-section through an extruded profile 69 which is suitable for bridge elements. The extruded profile can be separated into the respectively desired slice thicknesses and then mechanically fine machined. The extruded profile 69 comprises lateral notches 70 which can be used, for example, for flush insertion of holders for carrying straps.

The design of the telescope according to the invention has very many similar parts which merely have to be assembled in a mirror-image manner. This results in rationalized production and stock-keeping.

The invention claimed is:

1. A binocular telescope with internal focusing and two cylindrical barrel tubes each fastened to a bridge and accommodating an objective lens, a focusing lens, a prism system for image inversion, and an eyepiece, wherein the prism system is configured so that within each barrel tube an optical axis of each barrel tube eyepiece is offset relative to an optical axis of each barrel tube's objective lens, wherein
    a rigid bridge is provided with two cylindrical apertures in which the barrel tubes are mounted parallel to one another with each barrel tube being rotatable about the optical axis of each barrel tube's objective lens, wherein
    the barrel tubes each comprise a rotary sleeve, an objective tube and an eyepiece tube connected thereto,
    the bridge is constructed in one piece and has a small length compared to a length of each of the barrel tubes,
    the rotary sleeves are inserted into the cylindrical apertures, and
    the objective tubes and the eyepiece tubes are connected to the rotary sleeves such that they lie rotatable on an upper side and a lower side of the bridge.

2. The binocular telescope as claimed in claim 1, wherein coupling means for even counter-rotation of the barrel tubes are provided within the bridge.

3. The binocular telescope as claimed in claim 2, wherein the coupling means are lockable.

4. The binocular telescope as claimed in claim 2, wherein toothed gearing which comprises two mutually meshing similar gear wheels and toothed rings cooperating therewith on the barrel tubes are provided as the coupling means.

5. The binocular telescope as claimed in claim 1, wherein a focusing knob is rotatably mounted on the bridge between the barrel tubes.

6. The binocular telescope as claimed in claim 5, wherein the focusing knob is adjustable into two axially offset detent positions.

7. The binocular telescope as claimed in claim 5, wherein the focusing knob is connected to a threaded spindle which extends into the bridge and is coupled within the bridge to a grooved disk in which the drive levers engage for axial displacement of the focusing lenses.

8. The binocular telescope as claimed in claim 7, wherein the grooved disk comprises, in a first region, a radial adjusting groove extending in one plane and, in a second region, a radial, axially rising, adjusting groove.

9. The binocular telescope as claimed in claim 7, wherein the coupling between the threaded spindle and the grooved disk is configured so that, in a first detent position of the focusing knob, on rotation thereof, the grooved disk is axially displaced via a straight guide and, in a second detent position of the focusing knob, on rotation thereof, the grooved disk is rotated.

10. The binocular telescope as claimed in claim 9, in the second detent position, the focusing knob reveals a diopter scale.

11. The binocular telescope as claimed in claim 1, wherein the barrel tubes are provided in the region of the cylindrical apertures with radial slits and in a central portion of the housing of the bridge, axial guide slits are provided through which drive levers are guided into the bridge for axial displacement of the focusing lenses.

12. The binocular telescope as claimed in claim 1, wherein at least one of the barrel tubes comprises, on the outer periphery thereof in a region adjoining the bridge, a scale for displaying the rotation of the barrel tubes relative to a marking placed on the bridge.

13. The binocular telescope as claimed in claim 1, wherein a tripod mounting is provided on the bridge, oriented perpendicularly to the barrel tubes.

14. The binocular telescope as claimed in claim 1, wherein the barrel tubes and/or the bridge are made from extruded profiles.

15. The binocular telescope as claimed in claim 14, wherein the extruded profiles are made of aluminum.

* * * * *